April 29, 1924.
J. A. TROUT
1,492,494
TRACTOR CLUTCH RELEASE
Filed Oct. 27, 1921
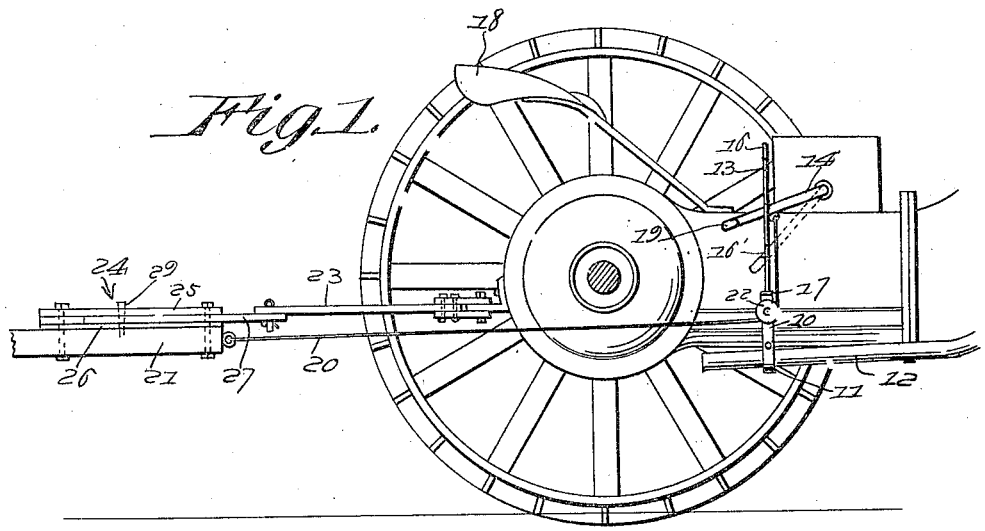
Fig.1.
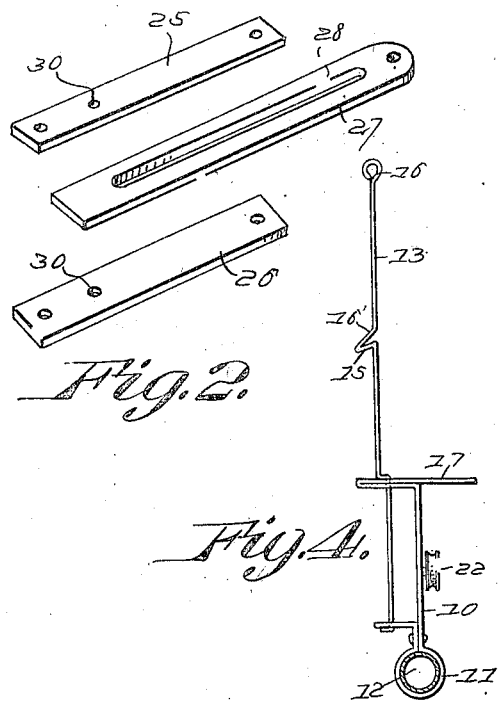
Fig.2.
Fig.4.
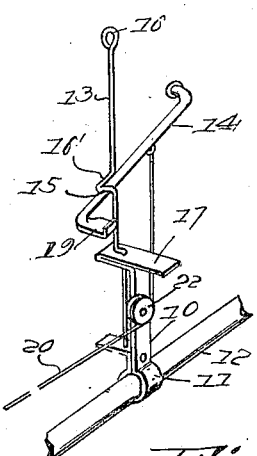
Fig.3.
Inventor
J. A. Trout,
By
Attorney Patented Apr. 29, 1924.

1,492,494

UNITED STATES PATENT OFFICE.

JAMES A. TROUT, OF BRONAUGH, MISSOURI.

TRACTOR CLUTCH RELEASE.

Application filed October 27, 1921. Serial No. 510,686.

*To all whom it may concern:*

Be it known that JAMES A. TROUT, a citizen of the United States of America, residing at Bronaugh, in the county of Vernon and State of Missouri, has invented new and useful Improvements in Tractor Clutch Releases, of which the following is a specification.

The object of the invention is to provide simple and efficient means in connection with a tractor whereby the clutch lever may be locked in the released position to permit of maintaining the tractor in a standing position without stopping the engine, and in that connection to provide means whereby should the agricultural machine which is trailing the tractor meet with an obstruction involving an excessive strain upon or resistance to the forward movement of the tractor, the clutch lever will be automatically swung to and locked in the released position; and with these objects in view the invention consists in a construction and combination of parts of which a preferred embodiment is shown in the accompanying drawings, wherein:—

Figure 1 is a side view of a clutch release mechanism embodying the invention applied in the operative position to adjacent portions of a tractor and agricultural machine drawn thereby.

Figure 2 is a detail view of the break pin connection between the tractor and the trailer, the parts being shown separated.

Figure 3 is a detail view in perspective of the clutch lever locking means.

Figure 4 is a rear view of the clutch lever locking means.

The clutch lever locking means consists essentially of a bracket 10 provided at its lower end with a clamp 11 for engagement with a suitable portion of the tractor indicated at 12, and consisting for example of an exhaust pipe thereof, said bracket having an upwardly extending transversely yielding stem 13 located adjacent to the path of swinging movement of the clutch lever 14 of the tractor and provided with an offset forming a shoulder 15 which is so located with reference to the path of movement of the clutch lever as to engage the latter when it reaches its depressed or clutch releasing position.

Whereas the bracket may be of substantially rigid material, consisting in the construction illustrated of a plate folded upon itself to provide a loop forming the clamp 11, the stem 13 should consist of a rod of spring metal rising from the upper end of the bracket and provided at its upper extremity with a grip or handle 16 which may be grasped by the operator to deflect said stem in order to release the clutch lever by withdrawing the shoulder 15 from the path thereof. The offset forming the shoulder 15 is provided with a deflected upper side as indicated at 16' so that in engaging the clutch lever it is only necessary to depress the same in order to cause lateral deflection of the stem.

The bracket is provided at its upper end with a lateral extension 17 forming the foot rest to be occupied by the foot of the operator when not employed in operating the clutch lever, said foot rest being in a convenient position to be reached by the occupant of the seat 18 and being preferable to the ordinary foot rest for the reason that it is not exposed to the heat of the engine to the same extent as the ordinary foot rest particularly in tractors of the Fordson type. The clutch lever is provided with the usual terminal rest or stirrup 19 to receive the pressure of the foot of the operator.

In order that the movement of the clutch lever to the release position may be effected in the event that an undesirable resistance or strain should be applied to the tractor through the trailing machine encountering an usual obstacle or becoming damaged or inoperative for any reason, there is provided a connection, preferably flexible and consisting for example of a cable 20 extending from the stub tongue 21 of the trailing machine to the clutch lever 14 and passing intermediately around a direction pully 22 mounted upon the standard of the bracket. Also in connection with the draw bar 23 by which the tongue is connected with the tractor there is employed a clevis 24, which may as shown be mounted upon the stub tongue 21 and consists of the friction plates 25 and 26 and the interposed slide bar 27 having a longitudinal slot 28 through which extends a break pin 29 seated in suitable openings 30 in said friction plates. Under normal conditions the slide plate is frictionally held by the plates 25 and 26 in a fixed position with relation to the stub tongue so that the tractor may apply the required tractive force to the trailer, but in the event that the trailer should meet with an unusual obstruction the slide bar 27 will be drawn forward and cause the breakage of the pin 29, with the result that the tension applied to the flexible connection 20 will draw the clutch lever to its release position where it will be engaged by the shoulder 15 to bring the tractor to a stop without interfering with the continuance of the motor of the engine.

Having described the invention, what is claimed as new and useful is:—

1. A clutch locking means for tractors having a bracket, and a yielding stem carried by the bracket and arranged adjacent to the path of movement of the tractor clutch lever, said stem being formed with a lateral offset constituting a shoulder for engagement with the lever at the limit of its clutch releasing movement, said stem being extended upwardly beyond the offset and terminating in a grip, said extended portion being deflected for sliding engagement with the clutch lever when the same is depressed whereby the offset portion may be deflected for engagement with the lever in its clutch releasing position.

2. A clutch release and locking means for tractors consisting of a bracket mounted upon the tractor adjacent to the path of movement of the clutch lever, a flexible connection between the clutch lever and a trailer, a guide on the bracket traversed by said connection, and means on the bracket for engaging the clutch lever when it has reached its clutch releasing position.

3. A clutch release and locking means for tractors consisting of a bracket mounted upon the tractor adjacent to the path of movement of the clutch lever, a flexible connection between the clutch lever and a trailer, a guide on the bracket traversed by said connection, and means on the bracket for engaging the clutch lever when it has reached its clutch releasing position, a break pin clevis being interposed between the tractor and the trailer.

4. A clutch release and locking means for tractors consisting of a bracket mounted upon the tractor adjacent to the path of movement of the clutch lever, a flexible connection between the clutch lever and a trailer, a guide on the bracket traversed by said connection, and means on the bracket for engaging the clutch lever when it has reached its clutch releasing position, a break pin clevis being interposed between the tractor and the trailer, and consisting of spaced friction plates and an interposed slide plate having a slot for the reception of a frangible pin carried by the friction plates.

In testimony whereof he affixes his signature.

JAMES A. TROUT.